United States Patent [19]

Aiken

[11] Patent Number: 5,417,613
[45] Date of Patent: May 23, 1995

[54] BEARING CUP RETAINER FOR UNIVERSAL JOINT

[75] Inventor: Albert Aiken, Toledo, Ohio

[73] Assignee: Dana Corporation, Toledo, Ohio

[21] Appl. No.: 163,323

[22] Filed: Dec. 6, 1993

[51] Int. Cl.$^6$ ................................................. F16D 3/40
[52] U.S. Cl. ..................................... 464/130; 403/155; 464/134
[58] Field of Search ................ 464/128, 130, 134, 136; 403/154, 155, 12

[56] References Cited

U.S. PATENT DOCUMENTS

| | | |
|---|---|---|
| 2,036,978 | 4/1936 | Anderson . |
| 2,515,691 | 6/1950 | Smith et al. ........................ 464/130 |
| 2,636,362 | 4/1953 | Dunn . |
| 2,912,838 | 11/1959 | Zeller . |
| 3,352,127 | 11/1967 | Skinner, Sr. . |
| 3,803,873 | 4/1974 | Goller . |
| 4,138,869 | 2/1979 | Olson ................................... 464/130 |
| 4,505,058 | 3/1985 | Peterson .......................... 403/155 X |
| 5,048,996 | 9/1991 | DuBois et al. ................... 403/155 X |

FOREIGN PATENT DOCUMENTS 789480  1/1958  United Kingdom ................ 464/130

*Primary Examiner*—Daniel P. Stodola
*Assistant Examiner*—Eileen A. Dunn
*Attorney, Agent, or Firm*—MacMillan, Sobanski & Todd

[57] ABSTRACT

A structure for retaining a bearing cup mounted on a universal joint cross within an opening formed through an arm of an end yoke during use. An external circumferential groove is formed about the outer surface of the bearing cup. An internal circumferential groove is formed about the inner surface of the opening formed through the arm of the end yoke. A recessed area is formed on a surface of the arm of the end yoke adjacent to the opening. The recesses area is of sufficient depth that it extends below the internal groove formed within the opening. Thus, a portion of the internal groove is exposed to the arm surface. To retain the bearing cup within the opening, a snap ring having a ventral portion and a pair of leg portions is installed such that the leg portions extend into the internal groove formed in the opening. The bearing cup is inserted within the opening until the external groove on the bearing cup is aligned with the internal groove formed in the opening. When this occurs, the leg portions of the snap ring extend into both the external groove formed in the bearing cup and the internal groove formed in the opening. The central portion of the snap ring is maintained within the recesses area formed in the surface of the end yoke arm. As a result, access to the snap ring is maintained for easy removal when disassembly of the bearing cup from the end yoke arm is desired.

12 Claims, 3 Drawing Sheets

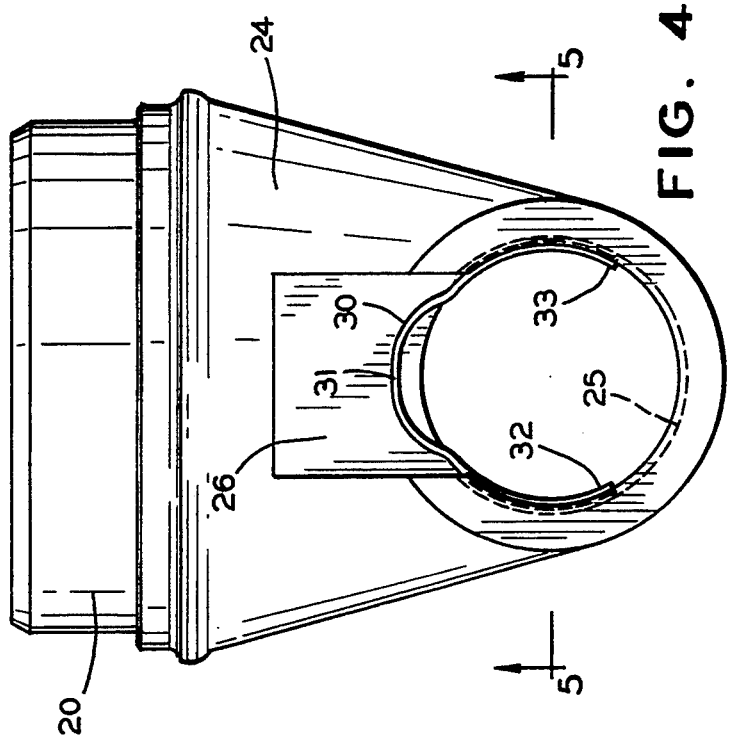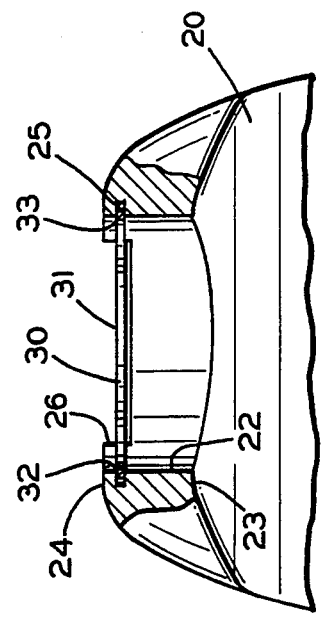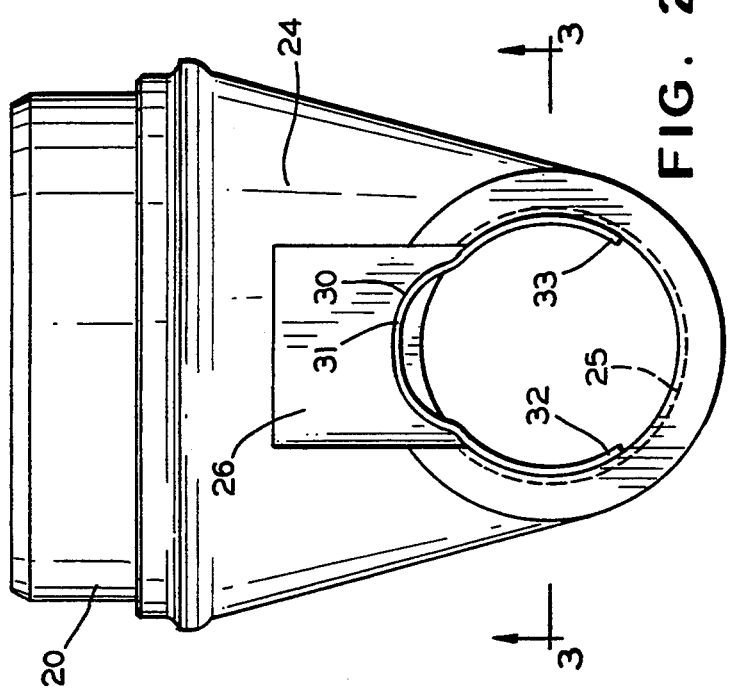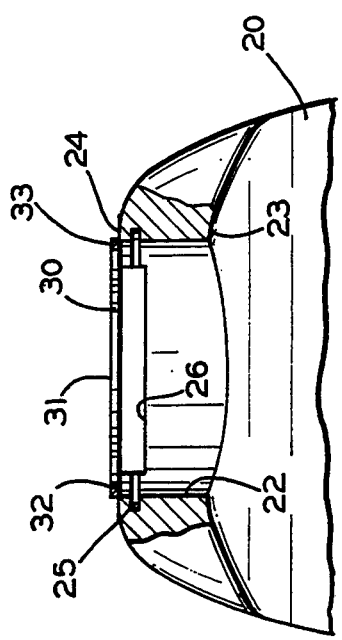

BEARING CUP RETAINER FOR UNIVERSAL JOINT

BACKGROUND OF THE INVENTION

This invention relates in general to universal joints and in particular to an improved structure for retaining a bearing cup mounted on a universal joint cross within an opening formed through an arm of an end yoke during use.

Universal joints are well known devices which provide a driving connection between two members adapted to rotate about non-aligned axes of rotation. For example, universal joints are widely used between two rotatable drive shafts in vehicle drive train systems. Typically, such a universal joint includes a cross having a central body with four trunnions extending outwardly therefrom. The trunnions are oriented in a single plane and extend at right angles relative to one another. A bearing cup is mounted on the end of each of the trunnions. One pair of opposed bearing cups is connected to a first end yoke secured to the first drive shaft, while the other pair of opposed bearing cups is connected to a second end yoke secured to the second drive shaft. Needle bearings or similar means are provided between each of the trunnions and its associated bearing cup to permit the bearing cup to freely rotate relative to the trunnion.

Typically, each of the end yokes is formed having a pair of opposed arms, and each of these arms has an opening formed therethrough. The opposed bearing cups are received within the openings formed through the opposed arms of the associated end yoke during assembly. Thereafter, retaining structures are usually mounted on the end yoke over the ends of the openings to prevent the bearing cups from moving outwardly apart from one another. A number of bearing cup retainer structures are known in the art for this purpose. However, it has been found that known bearing cup retainer structures are relatively complicated and expensive in structure and are relatively difficult to assemble and disassemble. Accordingly, it would be desirable to provide an improved bearing cup retaining structure for a universal joint which is simple and inexpensive to construct, assemble, and disassemble.

SUMMARY OF THE INVENTION

This invention relates to an improved structure for retaining a bearing cup mounted on a universal joint cross within an opening formed through an arm of an end yoke during use. An external circumferential groove is formed about the outer surface of the bearing cup. An internal circumferential groove is formed about the inner surface of the opening formed through the arm of the end yoke. A recessed area is formed on a surface of the arm of the end yoke adjacent to the opening. The recessed area is of sufficient depth that it extends below the internal groove formed within the opening. Thus, a portion of the internal groove is exposed to the arm surface. To retain the bearing cup within the opening, a snap ring having a central portion and a pair of leg portions is installed such that the leg portions extend into the internal groove formed in the opening. The bearing cup is inserted within the opening until the external groove on the bearing cup is aligned with the internal groove formed in the opening. When this occurs, the leg portions of the snap ring extend into both the external groove formed in the bearing cup and the internal groove formed in the opening. The central portion of the snap ring is maintained within the recessed area formed in the surface of the end yoke arm. As a result, access to the snap ring is maintained for easy removal when disassembly of the bearing cup from the end yoke arm is desired.

Various objects and advantages of this invention will become apparent to those skilled in the art from the following detailed description of the preferred embodiments, when read in light of the accompanying drawings.

BRIEF DESCRIPTION OF THE DRAWINGS

FIG. 2 is a top plan view of the upper arm of the end yoke illustrated in FIG. 1 showing the associated snap ring prior to installation therein.

FIG. 3 is a sectional elevational view taken along line 3—3 of FIG. 2.

FIG. 4 is a top plan view similar to FIG. 2 showing the snap ring installed in the arm of the end yoke.

FIG. 5 is a sectional elevational view taken along line 5—5 of FIG. 4.

DETAILED DESCRIPTION OF THE PREFERRED EMBODIMENT

Figure 1:
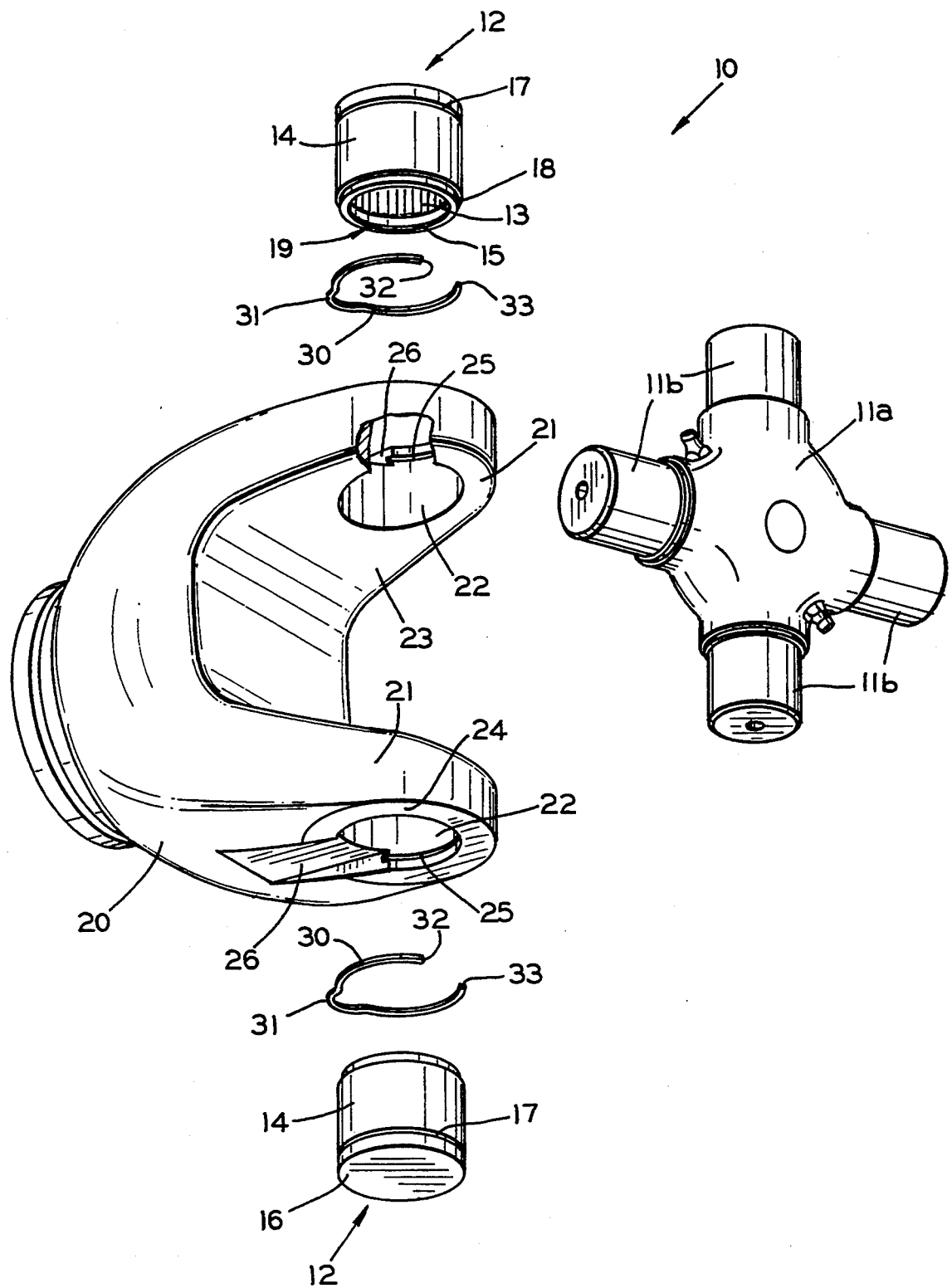
FIG. 1 is an exploded perspective view of a universal joint and end yoke assembly including a bearing cup retainer structure in accordance with this invention.

Referring now to the drawings, there is illustrated in FIG. 1 an exploded perspective view of a universal joint and end yoke assembly, indicated generally at 10, in accordance with this invention. The universal joint portion of the assembly 10 includes a conventional cross which is composed of a central body 11a having four trunnions 11b extending radially outwardly therefrom. The trunnions 11b lie in a single plane and are oriented at right angles relative to one another. A bearing cup, indicated generally at 12, is provided for mounting on the end of each of the trunnions 11b. Two of such bearing cups 12 are illustrated in FIG. 1 for connection to the end yoke portion of the assembly 10, as will be described below. However, it will be appreciated that two additional bearing cups 12 are provided on the other two trunnions 11b. Needle bearings 13 or similar means are provided between each of the trunnions 11b and its associated bearing cup 12 to permit the bearing cup 12 to freely rotate relative to the trunnion 11b upon which it is mounted.

Each of the bearing cups 12 is formed generally in the shape of a hollow cylinder, having an outer cylindrical surface 14, an opened end 15, and a closed end 16. An external groove 17 is formed about the outer cylindrical surface 14 of each of the bearing cups 12. In the illustrated embodiment, the external groove 17 is located near the closed end 16 of the bearing cup 12. However, the external groove 17 may be located at any location along the outer cylindrical surface 14 of the bearing cup 12. The thickness of the bearing cup 12 is slightly reduced adjacent to the opened end 15 thereof, resulting in a radially inwardly tapered portion 18. The purpose of this tapered portion 18 will be explained below. If desired, a conventional seal and dust guard assembly, indicated generally at 19, may be installed on each of the bearing cups 11b adjacent to the opened end thereof.

The end yoke portion of the assembly 10 includes a conventional body 20 having a pair of spaced apart arms 21 extending therefrom. The arms 21 are identical in structure, each having a cylindrical opening 22 formed therethrough which extends from an inner arm surface 23 to an outer arm surface 24. A cylindrical internal groove 25 is formed in each of the inner cylindrical surfaces defined by the openings 22 formed in the arms 21. In the illustrated embodiment, the internal grooves 25 are located near the outer arm surfaces 24 of each of the arms 21. However, the internal grooves 25 may be located at any desired locations along the inner cylindrical surfaces defined by the openings 22.

Figure 8:
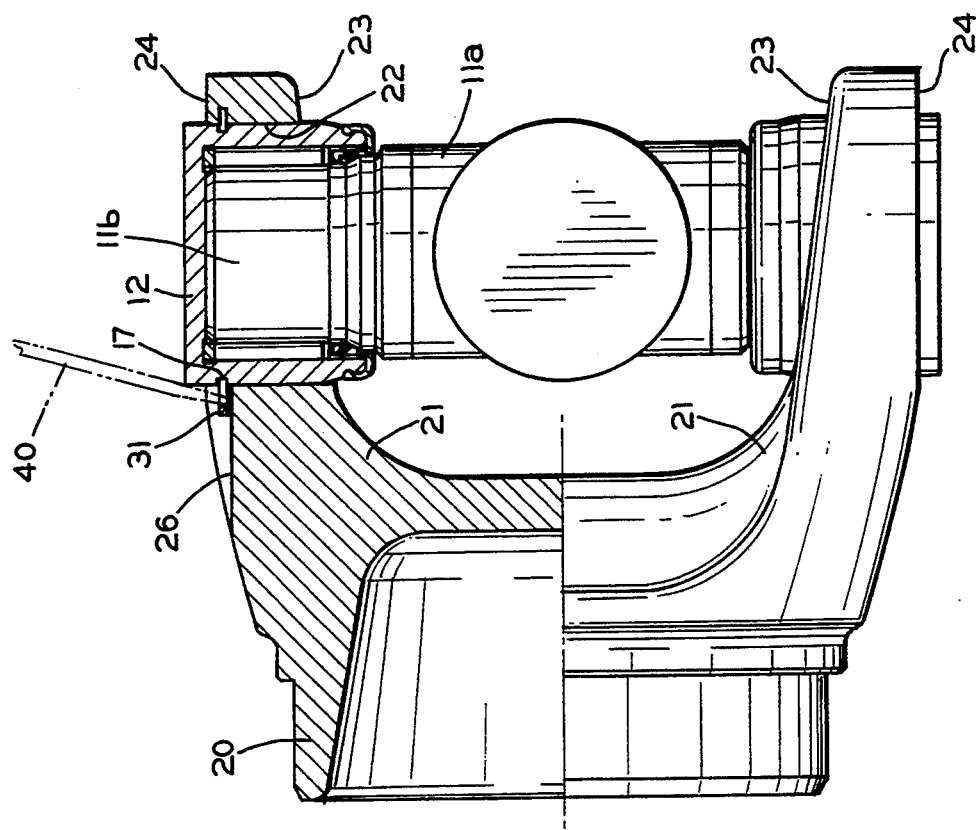
FIG. 8 is a sectional elevational view taken along line 8—8 of FIG. 7.

A planar recessed area 26 is formed in each of the outer arm surfaces 24 adjacent to the respective openings 22. Each of the recessed areas 26 extends along its associated outer arm surface 24 toward the body 20 of the end yoke. As best shown in FIG. 8, the recessed areas 26 are of sufficient depth that they extend below the respective internal grooves 25 formed within the openings 22. Thus, a portion of each of the internal grooves 25 is exposed to the respective outer arm surfaces 24. Alternatively, the recessed areas 26 may be formed in either or both of the inner arm surfaces 23 adjacent to the respective openings 22. The recessed areas 26 may be formed when the end yoke is cast, or may be machined in the end yoke after it has been formed. The purpose of the recessed area 26 will be explained below.

A snap ring, indicated generally at 30, is provided for retaining each of the bearing cups 12 within the respective openings 22 formed through the arms 21 of the end yoke. As best shown in FIGS. 1, 2, and 4, each of the snap rings 30 is generally C-shaped, having a central portion 31, a first leg portion 32, and a second leg portion 33. The leg portions 32 and 33 are arcuate in shape and generally extend along a predetermined radius. That predetermined radius is preferably selected to be approximately equal to the the radius defined by both the external groove 17 formed in the bearing cup and the internal groove 25 formed in the end yoke. The central portion 31 is also arcuate in shape, but extends outside of the radius defined by the leg portions 32 and 33. The snap rings 30 are preferably formed from a suitably resilient material, such as spring steel, and have a rectangular cross sectional shape. Also, the snap rings 30 preferably extend throughout an arc of from approximately 234° to approximately 238° from the end of the first leg portion 32 to the end of the second leg portion 33.

The construction of the universal joint and end yoke assembly 10 will now be explained. Initially, the snap rings 30 are installed within the respective openings 22 formed through the arms 21 of the end yoke. To accomplish this, a first snap ring 30 is initially positioned above the opening 22 formed through one of the arms 21, with the central portion 31 being located above the recessed area 26. Then, the leg portions 32 and 33 are compressed together slightly, as shown in FIGS. 2 and 3, so that the snap ring 30 can be inserted within the opening 22. Once inserted into the opening 22, the snap ring 30 is moved into alignment with the internal groove 25. When so aligned, the leg portions 32 and 33 will spring outwardly into the internal groove 25, as shown in FIGS. 4 and 5. As shown therein, the outer circumferential edges of the leg portions 32 and 33 extend within the internal groove 25, while the inner circumferential edges of the leg portions 32 and 33 extend into the opening 22. Similarly, a second snap ring 30 is installed in the opening 22 formed through the other of the arms 21.

Figure 6:
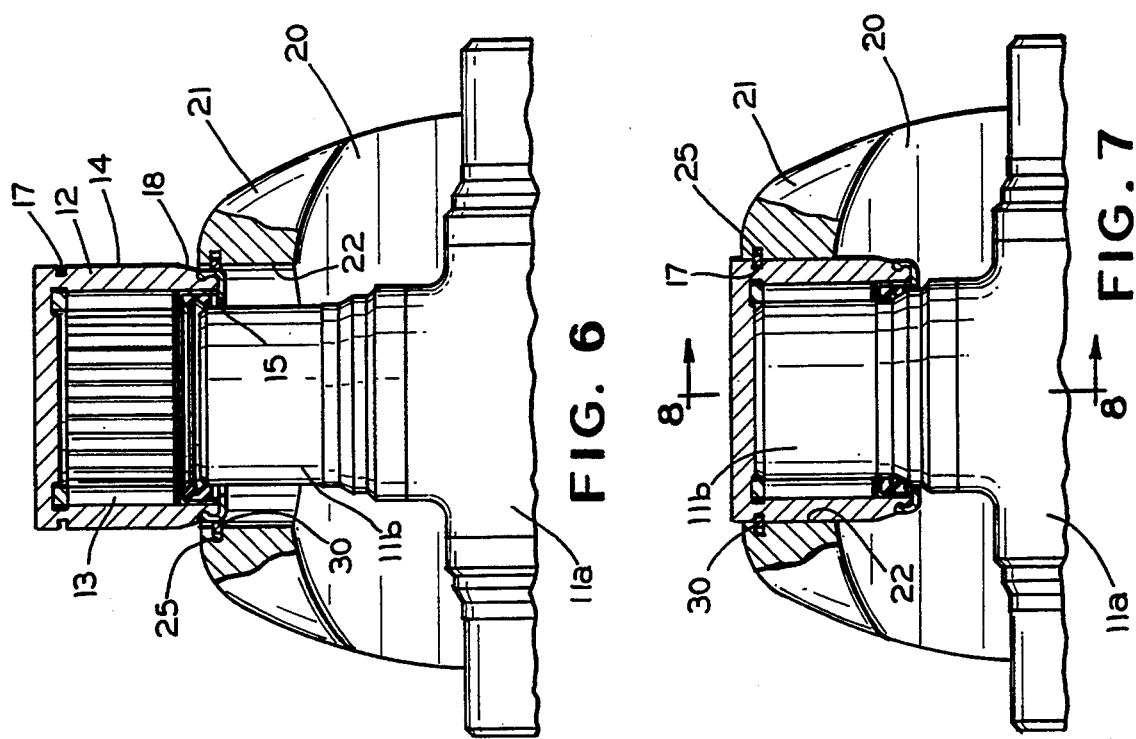
FIG. 6 is a end elevational view, partially in cross section, of the universal joint and end yoke assembly illustrated in FIG. 1 showing the upper bearing cup prior to installation therein.

Next, the body 11a of the universal joint cross is oriented such that two of the opposed trunnions 11b are loosely received within the openings 22 formed through the opposed arms of the end yoke, as shown in FIG. 6. Then, the bearing cups 12 are installed upon the opposed trunnions 11b. To accomplish this, the bearing cup 12 is co-axially aligned with the trunnion 11b with the opened end 15 disposed adjacent to the end thereof, as shown in FIG. 6. The bearing cup 12 is then moved axially toward the trunnion 11b. The tapered surface 18 provided about the opened end 15 of the bearing cup 12 initially engages the snap ring 30, spreading the leg portions 32 and 33 apart from one another to accommodate the outer surface 14 of the bearing cup 12.

Figure 7:
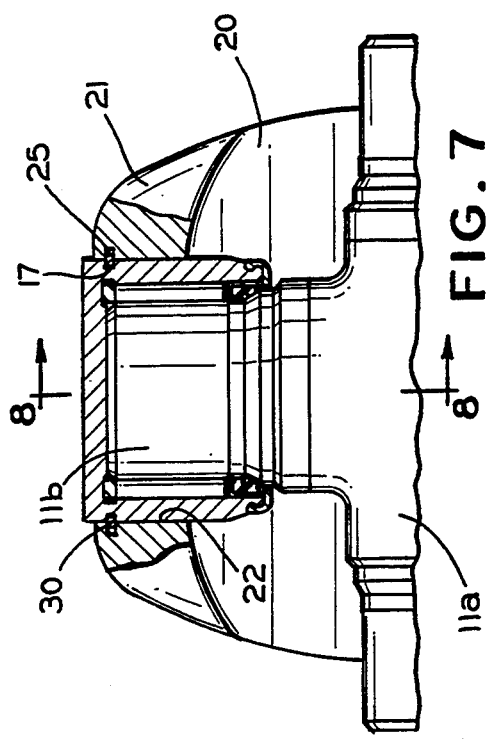
FIG. 7 is an end elevational view similar to FIG. 6 showing the upper bearing cup installed in the arm of the end yoke.

As the bearing cup 12 is moved axially further onto the trunnion 11b, the leg portions 32 and 33 of the snap ring 30 slide along the outer surface 14. This continues until the external groove 17 is aligned with the internal groove 25, as shown in FIG. 7. At that point, the leg portions 32 and 33 of the snap ring 30 snap inwardly into portions of the external groove 17. Because the snap ring 30 extends into both the external groove 17 and the internal groove 25, the bearing cup 12 is retained within the opening 22 of the end yoke during use. The other bearing cup 12 can be installed on the opposed trunnion 11b in a similar manner.

After assembly, the central portions 31 of both of the snap rings 30 are maintained in the respective recessed areas 26 formed in the arms 21, as shown in FIG. 8. Because they are maintained within these recessed areas 26, the central portions 31 are prevented from contacting any article during use which might tend to dislodge or otherwise unintentionally remove the snap rings 30. However, they are conveniently located for quick and easy removal when desired. This can be accomplished by inserting the end of a tool, such as a screw driver shown in dotted lines at 40, into the recessed area 26 and engaging the central portion of the snap ring 30. The tool 40 may then be utilized to slide the snap ring 30 away from the bearing cup 12. Once the snap ring 30 has been removed from the external groove 17 and the internal groove 25, the bearing cup 12 may be removed by moving it axially outwardly from about the associated trunnion 11b.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A universal joint and end yoke assembly comprising:
   a cross having an outwardly extending trunnion;
   a bearing cup rotatably mounted on said trunnion, said bearing cup defining an external surface having an external groove formed therein;

an end yoke including an arm having a surface and an opening formed therethrough from said surface, said opening defining an internal surface having an internal groove formed therein, a recessed area being formed in said surface of said arm adjacent to said opening, said recessed area being of sufficient depth to extend below said internal groove; and a snap ring having a first portion and a second portion, said second portion of said snap ring extending into both said external groove formed in said bearing cup and said internal groove formed in said opening to retain said bearing cup in said arm, said first portion of said snap ring being maintained in said recessed area.

2. The universal joint and end yoke assembly defined in claim 1 wherein said external groove extends circumferentially about said external surface of said bearing cup.

3. The universal joint and end yoke assembly defined in claim 1 wherein said internal groove extends circumferentially about said internal surface of said opening.

4. The universal joint and end yoke assembly defined in claim 1 wherein said first portion of said snap ring is a central portion and said second portion of said snap ring is a first leg portion, and further including a second leg portion extending from said central portion, both of said first and second leg portions of said snap ring extending into both said external groove formed in said bearing cup and said internal groove formed in said opening to retain said said bearing cup in said arm, said central portion of said snap ring being maintained in said recessed area.

5. The universal joint and end yoke assembly defined in claim 4 wherein said snap ring defines an arc from an end of said first leg portion to an end of said second leg portion which in the range of 234° to 238°.

6. A universal joint and end yoke assembly comprising:

a cross having a plurality of outwardly extending trunnions;

a bearing cup rotatably mounted on each of said trunnions, each of said bearing cups defining an external surface having an external groove formed therein;

an end yoke including a plurality of arms, each of said arms having a surface and an opening formed therethrough from said surface, each of said openings defining an internal surface having an internal groove formed therein, a recessed area being formed in each of said surfaces of said arms adjacent to said openings, said recessed areas being of sufficient depth to extend below said internal grooves; and a plurality of snap rings, each of said snap rings having a first portion and a second portion, said second portions of each of said snap rings extending into associated pairs of both said external grooves formed in said bearing cups and said internal grooves formed in said openings to retain said bearing cups in said arms, said first portions of said snap rings being maintained in said recessed areas.

7. The universal joint and end yoke assembly defined in claim 6 wherein each of said external grooves extends circumferentially about said external surfaces of said bearing cups.

8. The universal joint and end yoke assembly defined in claim 6 wherein each of said internal grooves extends circumferentially about said internal surfaces of said openings.

9. The universal joint and end yoke assembly defined in claim 6 wherein said first portions of said snap rings are central portions and said second portions of said snap rings are first leg portions, each of said snap rings further including a second leg portion extending from said central portions, said first and second leg portions of each of said snap rings extending into associated pairs of both said external grooves formed in said bearing cups and said internal grooves formed in said openings to retain said said bearing cups in said arms, said central portions of said snap rings being maintained in said recessed areas.

10. The universal joint and end yoke assembly defined in claim 9 wherein each of said snap rings defines an arc from an end of said first leg portion to an end of said second leg portion which in the range of 234° to 238°.

11. An end yoke comprising:

a plurality of arms, each of said arms having a surface;

an opening formed through each of said arms from said surface, each of said openings defining an internal surface having an internal groove formed therein; and a recessed area formed in each of said surfaces of said arms adjacent to said openings, said recessed areas being of sufficient depth to extend below said internal grooves.

12. The end yoke defined in claim 11 wherein each of said internal grooves extends circumferentially about said internal surfaces of said openings.

* * * * *